April 26, 1932. R. M. KRISAN 1,855,974
SKID CHAIN
Filed June 25, 1931 2 Sheets-Sheet 1
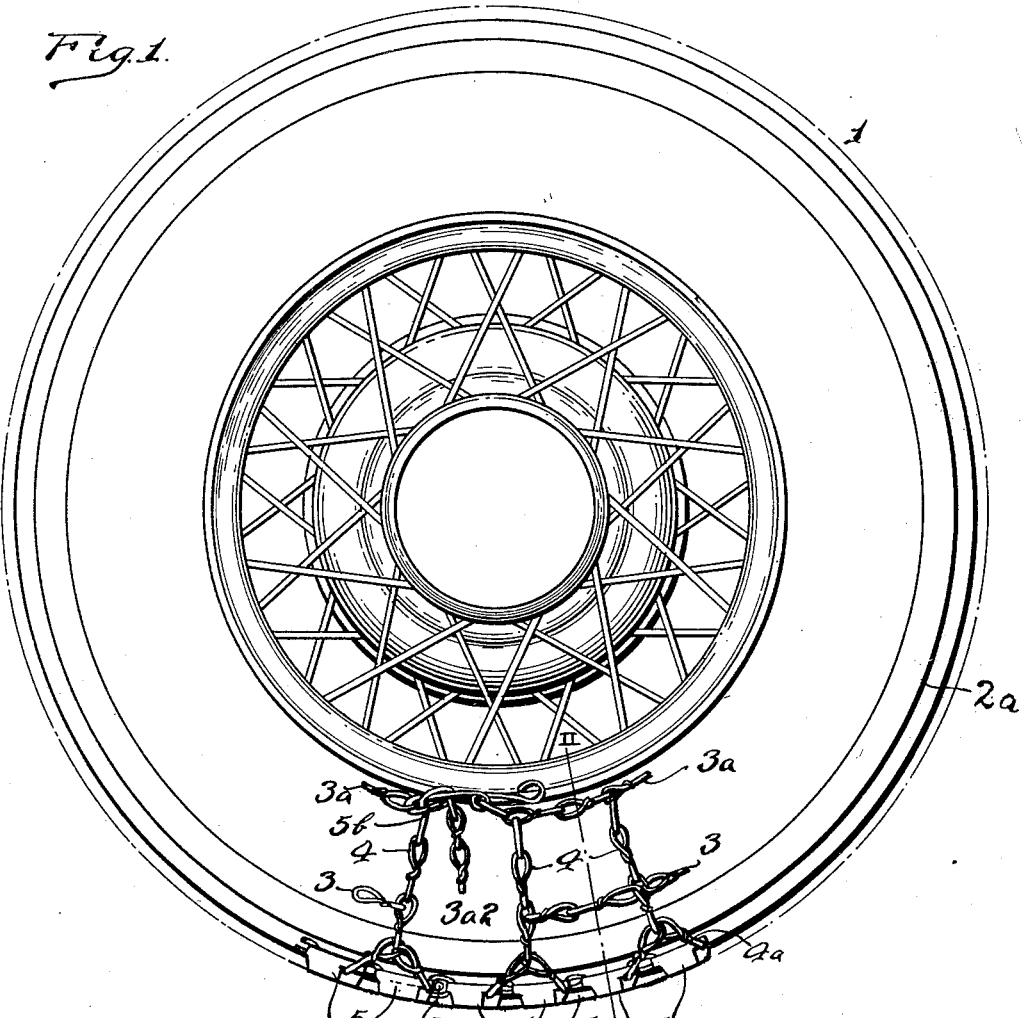
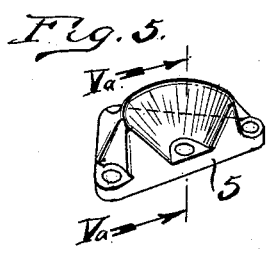
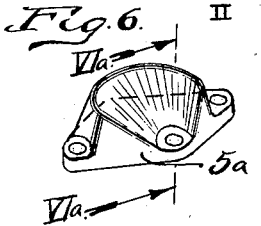
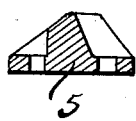
INVENTOR.
RUDOLPH M. KRISAN.
BY
ATTORNEY.

April 26, 1932.  R. M. KRISAN  1,855,974
SKID CHAIN
Filed June 25, 1931  2 Sheets-Sheet 2
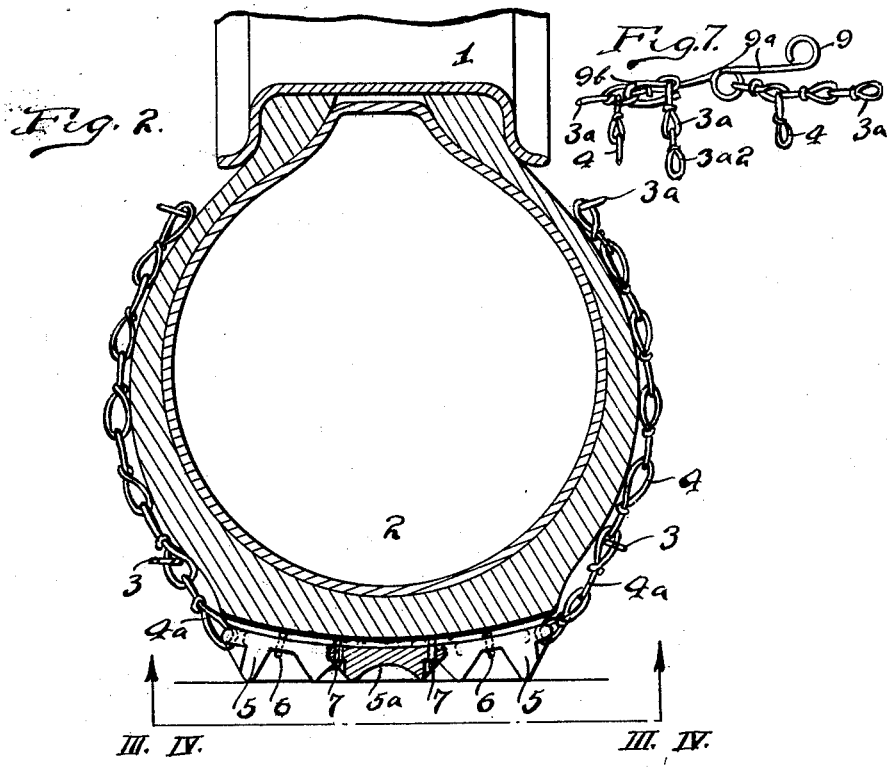
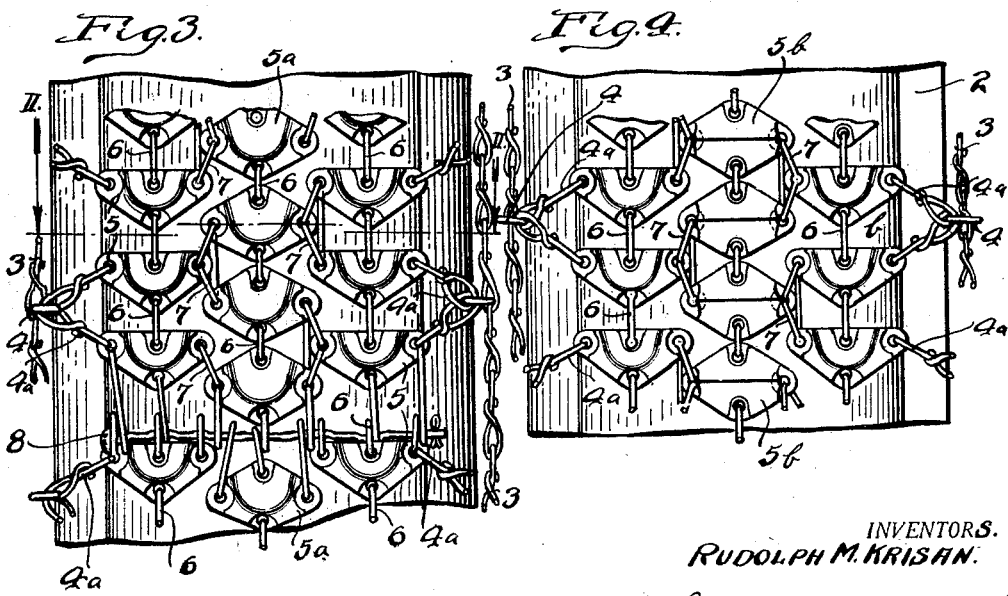
INVENTORS.
RUDOLPH M. KRISAN.
BY *Elliott Stoddard*
ATTORNEY.

Patented Apr. 26, 1932

1,855,974

UNITED STATES PATENT OFFICE

RUDOLPH M. KRISAN, OF HAMTRAMCK, MICHIGAN

SKID CHAIN

Application filed June 25, 1931. Serial No. 546,792.

My invention relates to skid chains and objects of my improvements are to provide a chain to be adjusted to automobile tires that shall protect the tire, prevent the slipping of the wheels on an icy, muddy or wet roadway, and that shall engage evenly upon the tire without injurious local action thereon.

I secure this object in the construction illustrated in the accompanying drawings, in which:—

Figure 1 is a side elevation of an automobile wheel, and part of a chain embodying my invention attached thereto.

Figure 2 is a section on the line II, II, Figure 1.

Figure 3 is an inverted plan view of a portion of the tire with the apparatus embodying my invention attached thereto, showing the portion that engages the roadway.

Figure 4 is a view similar to Figure 3, but showing a slightly modified construction.

Figures 5 and 6 are perspective views of two forms of engaging plates and Figures 5a and 6a are, respectively, sections of said plates in a plane parallel to that of the wheel when the plates are adjusted thereon.

Figure 7 is a detail view showing, to an enlarged scale, the way of joining the inner securing chain to adjust the apparatus to the wheel.

1 is an automobile wheel and 2 is a conventional rubber tire secured thereon. 3 is the outer and 3a the inner securing chain, which pass around the wheel. 4 are radially extending chains secured to the chains 3 and 3a and at their outer ends extending in Y-formed branches 4a, each of which engages and secures a plate 5.

Turning to Figure 3, 5 indicates plates which are pivotally connected by wire links 6, passing through apertures in their adjacent edges. There is a row or continuous series of plates 5 at each side of the tread of the wheel, passing around the same. 5a are plates joined similar to the plates 5, by links 6, and also joined by slanting links to adjacent plates 5. There is a row or series of plates 5a extending around the tread of the tire between the rows of plates 5, 5. The plates 5a are arranged in staggered relation to the plates 5 and are flexibly held therein by the links 7.

The branches 4a of the chains 4, engage pivotally through apertures in the outer edges of the plates 5.

The plates 5 and 5a are formed to a smooth surface on their inner sides that fits against the tread of the tire, and the united plates form a flexible network, interposed between the tread of the tire and the roadway.

As shown in Figures 5, 6, and 5a, 6a the plates 5 and 5a are formed outwardly into flanges to engage the roadway. In 5 and 5a the surface extends slantingly outward from the edges of the main plate to an engaging edge of the flange, which is of a horse-shoe or semi-circular shape. The slanting portion of the flange is then bored out, as shown, leaving a sufficient thickness to form an engaging ear, or portion, at the main plate and this engaging portion has an aperture formed through it, which is engaged by the chains 4a, or the links 6 and 7.

The plates are placed upon the tread of the tire so that the branches of the horseshoe shaped flanges shall extend parallel to the draft, with the opening between them toward an end of the vehicle and in the line of draft, and the connections between the plates is such that the flanges of said branches form part of the network, to bear the strains of the draft in the direction of their lengths and said flanges also act to partly protect the connecting links from the action of the road bed.

The united plates 5, 5a or 5b are preferably made of steel and form a flexible network, which is secured upon the tread by chains 3 and 3a, the latter being taken up to its proper length and fastened together by a proper engaging hook. I prefer to use the hook shown, which is designated by the reference character 9, having a loop 9a at its center and a hook 9b at its end. One end of the chain 3a is passed into the loop 9a, and the hook 9b is passed through one link and caused to engage a subsequent link of the other end of the chain 3a, the spare portion of the chain 3a being left overhanging, as indicated at $3a^2$, Figure 1.

The above described device will not injure the roadway, and will not slip or skid on an icy, muddy or wet surface.

The adjacent end edges of the network are joined by passing a pin 8 through links 6, which extend from both of said edges.

What I claim is:—

In an apparatus of the kind described, a flexible network consisting of a plurality of rows of plates, said plates being hinged together at their adjacent edges and having inner surfaces adapted to fit against the tread of an automobile tire, said inner surfaces together constituting the surface of said network that engages the tread of the tire, said plates being provided with flanges at their outer portions in the form of a horseshoe, or U, with their branches in the line of draft to engage the roadway in such a manner as to obviate slipping, the connecting members between the plates being attached thereto adjacent the ends of the branches of the U and at the bend thereof.

In testimony whereof I sign this specification.

RUDOLPH M. KRISAN.